March 26, 1963 I. D. BAUMEL 3,083,338

SPEECH COMMUNICATION SYSTEM

Filed Nov. 10, 1959 4 Sheets-Sheet 1

INVENTOR
IRWIN D. BAUMEL

BY James and Franklin
ATTORNEYS

INVENTOR
IRWIN D. BAUMEL
BY James and Franklin
ATTORNEYS

March 26, 1963 I. D. BAUMEL 3,083,338

SPEECH COMMUNICATION SYSTEM

Filed Nov. 10, 1959 4 Sheets-Sheet 3

INVENTOR
IRWIN D. BAUMEL

BY James and Franklin
ATTORNEYS

March 26, 1963 I. D. BAUMEL 3,083,338

SPEECH COMMUNICATION SYSTEM

Filed Nov. 10, 1959 4 Sheets-Sheet 4

INVENTOR
IRWIN D. BAUMEL
BY James and Franklin
ATTORNEYS

United States Patent Office 3,083,338
Patented Mar. 26, 1963

3,083,338
SPEECH COMMUNICATION SYSTEM

Irwin D. Baumel, Jericho, N.Y., assignor to Crosby Laboratories, Inc., Syosset, N.Y., a corporation of New York Filed Nov. 10, 1959, Ser. No. 852,029
3 Claims. (Cl. 325—65)

The present invention relates generally to systems used for the communication of vocal intelligence, and more particularly to improvement of the signal-to-noise ratio in speech communication systems.

It is the broad object of the present invention to provide an improved speech communication system.

It is a further object of the invention to provide a system which will more efficiently use the power output of the transmitter, and more effectively use the sensitivity of the receiver, by increasing the signal-to-noise ratio.

Another object of the invention is to reduce the vulnerability of voice communication to man-made as well as natural interference, including intentional jamming.

To accomplish the foregoing general objects, and other more specific objects which will hereinafter appear, my invention resides in the communication system elements and their relation one to another, as are hereinafter more particularly described in the following specification. The specification is accompanied by drawings in which.

Figure 2:
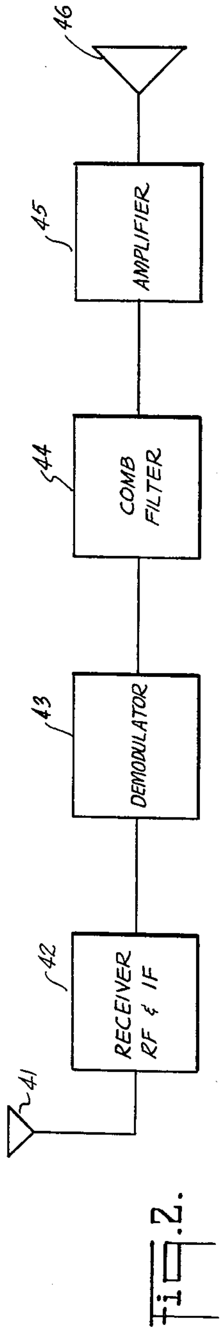
FIGURE 2 is a block diagram of a receiver for use with the same.
Figure 3:
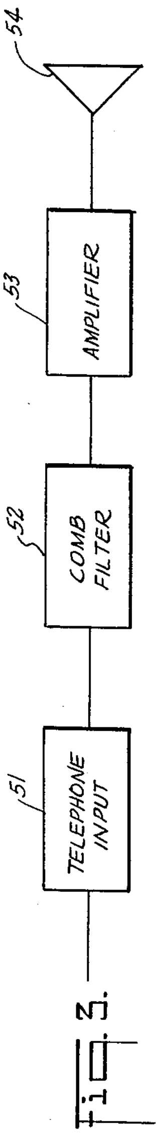
FIGURE 3 is a block diagram of a telephone receiver for the same.
Figure 4A:
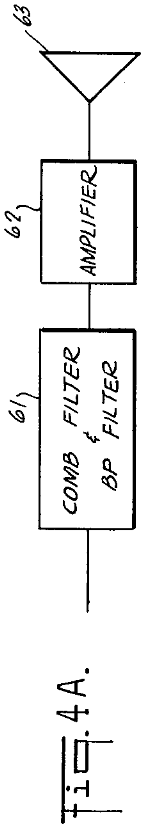
Figure 4:
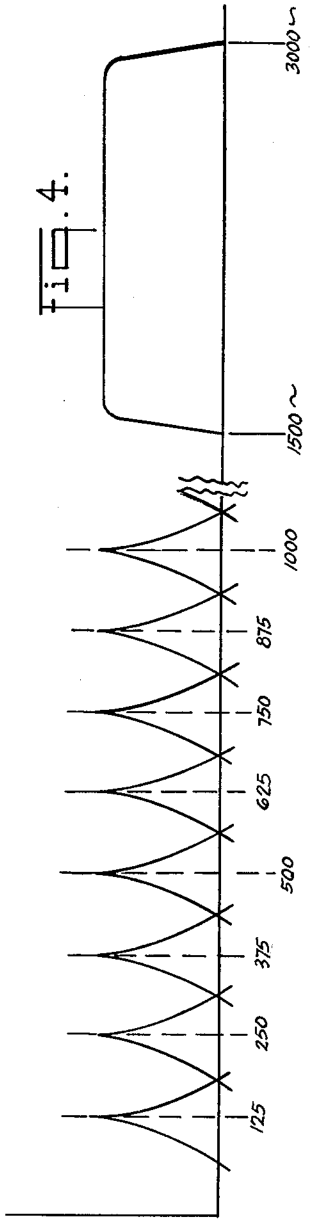
Figures 5, 7, 8, 9:
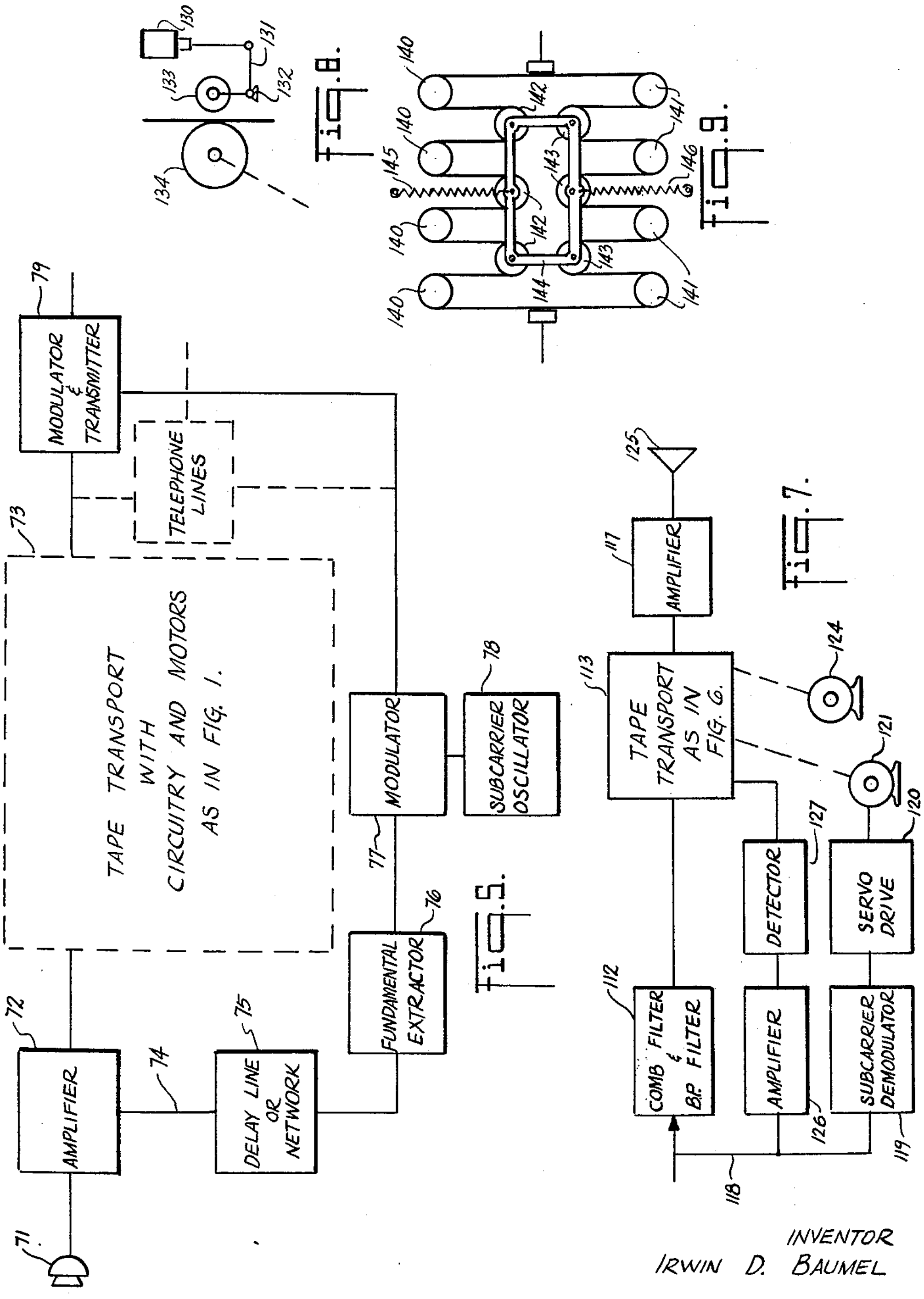
Figure 6:
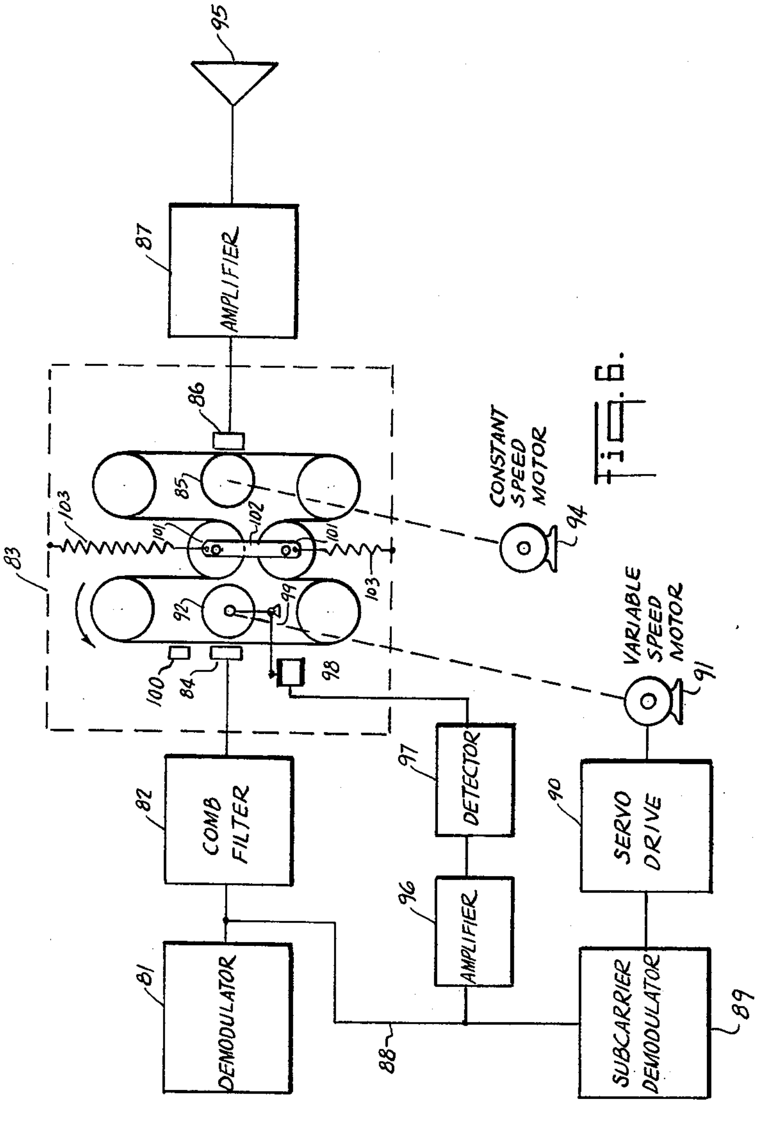

FIGURE 4 explains a filter used in the receivers shown in FIGURE 2 and FIGURE 3;

FIGURE 4A is a block diagram related to FIGURE 4;

FIGURE 5 is a diagram of another transmitter embodying further features of the present invention;

FIGURE 6 is a diagram of a receiver for use with the transmitter shown in FIGURE 5;

FIGURE 7 is a diagram of a telephone receiver for the same;

FIGURE 8 is explanatory of a detail; and

FIGURE 9 shows a modified tape festooning system.

The signal source is a normal voice speech signal generated by a human being. Voice speech signals can be shown to consist of two main types of signal. These are the voiced sounds, generated by use of the vocal chords, and the unvoiced sounds, generated by the passage of air over the cavities and protuberances in the vocal tract and mouth. Voiced sound is made up of the pitch frequency as generated by the vocal chords, and its upper harmonics, the major portion of which are below 1500 cycles. The unvoiced sounds are noise-like in nature (because of their random type frequency distribution), and include the sibilants, and are predominantly above 1500 cycles.

In normal speech the pitch frequency of the voiced sound is constantly varying. All their upper harmonics vary proportionately. This invention takes the voiced portion of normal speech with its constantly varying pitch and harmonics, and converts it to speech having a constant pitch frequency and its harmonics. The speech then is monotonic, with a predetermined fundamental frequency established by the apparatus. The monotonic speech then is used to modulate a carrier, using any desired modulation technique, or is used for direct transmission on a telephone line.

At the receiving terminal, after demodulation, or directly at the end of a telephone line, a comb filter is inserted ahead of the audio transducer. The pass bands of the comb filter are located at the predetermined pitch frequency and its harmonics as transmitted. The information contained in the voiced portion of the monotonic speech remains intact, but the spectrum between sequential harmonics is attenuated. The signal power then may be considered as remaining intact, while the noise or interference signal has been reduced. The result is an improvement in signal-to-noise ratio. The output signal at the signal transducer will, of course, be monotonic, but it is fully intelligible and conveys the desired information.

In some cases it is necessary and advantageous to incorporate the pitch variations in the reproduced voice signal at the receiver. For example, in public utility telephony the listener may want to recognize the voice of the speaker. For this purpose the input speech at the transmitter is monitored, the pitch variation signal is obtained, and this too is transmitted. At the receiver both signals are received. The monotonic voice signal, after filtering, is reconstructed or restored by using the pitch variation signal. The restored speech then is almost identical to that at the origin, but substantially the same improvement in signal-to-noise ratio is obtained.

Figure 1:
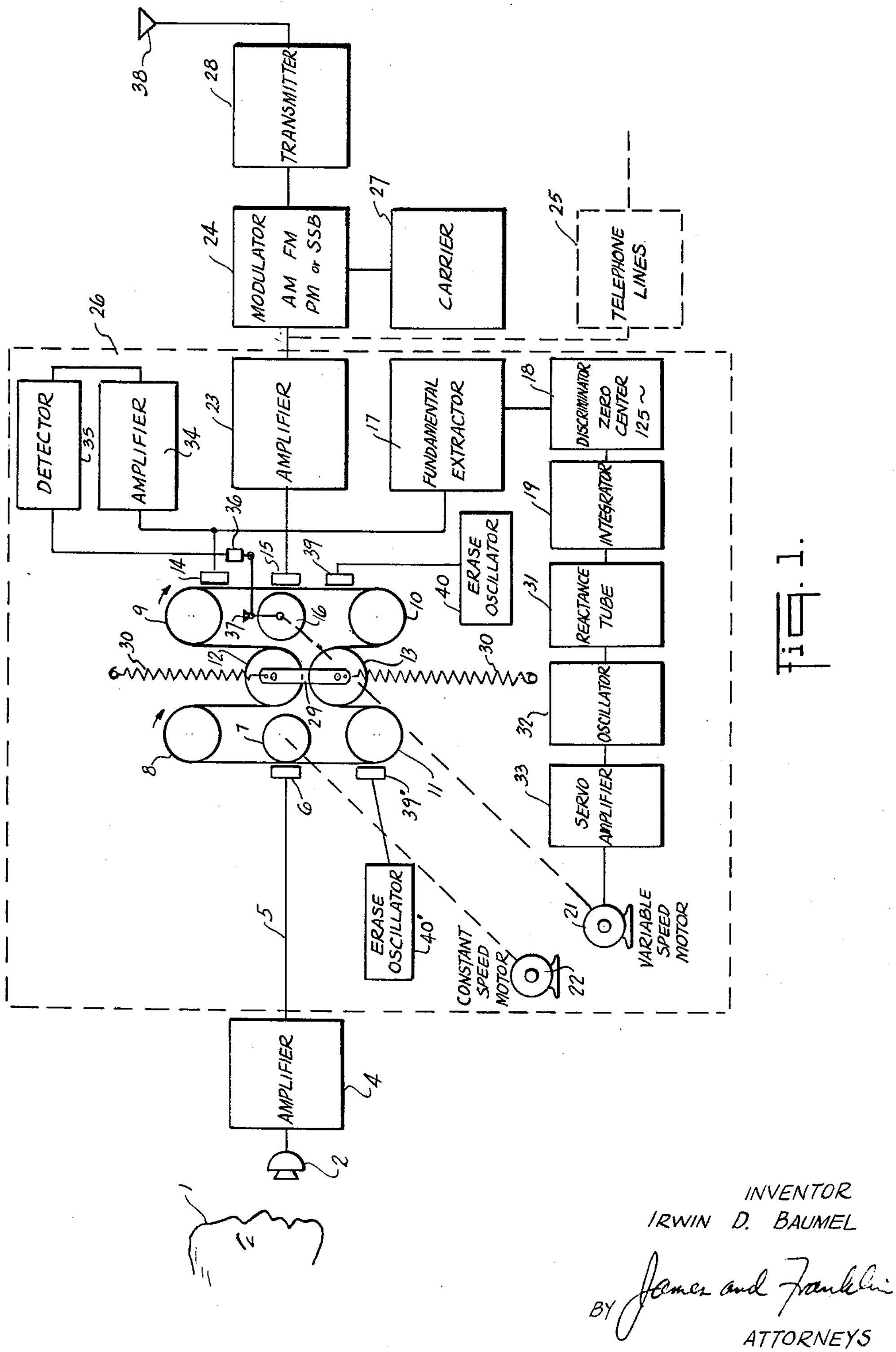
FIGURE 1 is a diagram of a transmitter embodying features of the present invention.

Referring to the drawings, and more particularly to FIG. 1, the apparatus for speech transmission comprises a means represented within dotted line box 26 for changing the speech energy emanating from a source, typically a person, to monotonic speech made up of a fixed predetermined fundamental frequency and its harmonics. This monotonic speech could be sent over a telephone line system, indicated at 25, or more usually on a high frequency carrier, and in the present case there is a carrier source 27, and a means 24 to modulate the carrier, followed by a transmitter 28 for transmitting the modulated carrier.

The receiver system is shown schematically in FIG. 2, referring to which the receiver 42 is followed by a means 43 to demodulate the carrier. The output of the demodulator is supplied to a comb filter 44 which selects the fundamental frequency and its harmonics, while attenuating the intermediate frequencies. This is shown at the left of FIG. 4, in which the fundamental frequency is assumed to be 125 cycles per second. The filtered monotonic speech is used to drive a transducer 46 (FIG. 2). The signal-to-noise ratio is greatly improved because of the attenuation of all of the frequencies intermediate the harmonics, as shown in FIG. 4.

Considering the apparatus in greater detail, and reverting to FIG. 1 of the drawing, the voice signal from source 1 is picked up by a microphone or transducer 2 which converts audible sound to electrical energy. This is applied to an amplifier 4 where it is properly amplified and compensated for application to a magnetic tape. It is then conveyed by line 5 to a tape recorder head 6. The tape is caused to move past the head 6 by means of a constant speed capstan 7. The rollers 8, 9, 10, and 11 are idlers located on fixed centers on the tape transport. The rollers 12 and 13 are also idlers but are movable and linked together by link 29, for simultaneous movement. They are spring loaded by opposed springs 30, and are capable of moving in either direction. Both 14 and 15 are tape playback heads. The tape engages a capstan 16 which causes the tape to pass the pickup heads 14 and 15 whenever voiced speech is picked up by head 14. The tape is disengaged from capstan 16 during intervals when no speech is present at the output of the playback head 14. This permits the two coupled, spring loaded idlers 12 and 13 to return to their neutral or mid position.

Such engage-disengage-clutch capstans as at 16 are used in tape recorder and data processing tape transports. The pickup head 14 monitors the recorded speech that has been put on the tape by the recording head 6 and applies it to two different circuits. One detects the presence of speech on the tape, and when speech is present, it activates the clutch so that the tape is pressed against the playback capstan. To do this, the output from the pickup head 14 is amplified at 34, and then applied to a detector circuit 35 having a fast attack time constant, and a decay time constant that will not permit the clutch to disengage until the speech on the tape passing head 14 is permitted to pass the pickup head 15. The D.C. output from the detector 35 is of sufficient amplitude to activate a relay 36 of the solenoid variety in order to engage the clutch. A thyratron may be used to activate the relay should further sensitivity be desired in this circuit.

The output of pickup head 14 is also applied to a device 17 called a fundamental extractor. Several such devices are available, one of which is described by Carl B. H. Feldman and Andrew C. Norwine, in their Patent No. 2,859,405, granted November 4, 1958. The output is the pitch or fundamental frequency of the recorded voice signal on the tape as it passes pickup head 14. This is not necessarily the pitch frequency as picked up by transducer 2. It will only be the true pitch frequency when idlers 12 and 13 are not in complex motion other than as idlers, and capstan 16 is disengaged, so that the tape speed is governed by the constant speed capstan 7. The extracted pitch frequency is applied to a zero center discriminator or FM detector 18.

The zero center frequency in this case is 125 cycles, but this is for illustration only, and the selected mid-frequency can be any frequency between 100 and 300 cycles. Some frequencies are more desirable than others, and if desired, one may provide for adjustment of the zero center. The output of the discriminator 18 is a voltage that is proportional to the frequency difference between the voice pitch as it is picked up by the tape head 14, and 125 cycles (or whatever center frequency is chosen for the discriminator). This output is applied to an integrator 19 (e.g. an RC circuit) which will determine the maximum rate of change of the feedback signal being applied to the variable speed motor 16. This is done here much as it is commonly done in servo loop practice, in order to prevent hunting.

The output of the integrator 19 goes to a reactance tube 31 followed by an oscillator 32 and a servo amplifier 33 which applies appropriate control information to a motor 21. The servo drive consists of a reactance tube 31, and an oscillator 32 the unbiased frequency of which corresponds to the frequency activating the constant speed drive motor 22. The oscillator output is amplified by a power amplifier 33 and then applied to the motor 21. This may be a low inertia synchronous motor, or it could be a variable speed D.C. motor. When an error signal is detected by pickup head 14, the error signal eventually appears as a change in oscillator frequency at 32, which in turn changes the speed of motor 21 in a direction to correct the error. An alternate method would use a D.C. capstan drive motor and provide D.C. amplification of an error potential which then is used to vary the speed in accordance with the error as detected by the discriminator.

The tape moves at constant speed past head 6, but at variable speed past head 15, and the variations are such as to reduce a higher fundamental (and its harmonics) and to increase a lower fundamental (and its harmonics), in order to produce a constant fundamental (and its harmonics), that is, to produce monotonic speech in head 15.

The speed changes involve a change in tape length between head 6 and head 15. This is provided by movement of linked idlers 12 and 13. However there could be a cumulative change which would be excessive, and to avoid this the capstan 16 is released whenever it is not needed, that is, during silent intervals such as pauses between words.

For this purpose a part of the output of pickup head 14 is amplified at 34 and detected at 35, the latter acting as a speech interval detector. As a schematic representation, its output is led to a relay-like magnet 36 controlling capstan 16 thru an angle lever 37. The tape is engaged for speech, and disengaged during pauses or silence.

For simplicity the capstan is shown movable. However in practice the capstan is stationary, and a small idler on the opposite side of the tape is moved toward or away from the capstan, as shown in FIG. 8, in which solenoid 130 moves angle lever 131 pivoted at 132 and carrying idler 133 opposite capstan 134. The mechanism may be like that used in tape transports for data processing, such as those made by Potter Instrument Co., Inc. of Plainview, N.Y.

Magnetic pickup head 15 (FIG. 1) removes the information contained on the tape, which is monotonic as it passes the head, and applies it to an amplifier 23. The amplifier output can then be made available for either modulation in an AM, FM, PM, or SSB transmitter, or any other type of transmitter that is commonly used for the modulation and transmission of voice intelligence. This is here indicated by modulator 24 for a carrier from source 27, and a transmitter 28, leading to an antenna 38. The output of amplifier 23 can also be applied directly to telephone lines 25, as shown in broken lines. The distance of monitor pickup head 14 from the main pickup head 15 is adjustable, and is made adequate to take care of the mechanical and electrical delays in the motor speed control loop 17, 18, 19, 31, 32, 33, 21.

Previous recording is erased ahead of the recording head 6. This is done by an erasing head 39 supplied from an erase oscillator 40. It might be at 39', 40', but head 39 is preferably located closely following head 15, to avoid repetition of speech after centering of idlers 12, 13.

Reference is now made to FIGURE 2 wherein the signal generated by the transmitter of FIGURE 1 is received, demodulated, and properly filtered, before being applied to a transducer. The modulated wireless signal arrives at antenna 41. It is then selectively chosen and amplified by a receiver 42, including RF and IF amplifiers as is common practice in wireless receivers. The signal then is applied to a demodulator 43 where the complete intelligence is removed from the carrier by standard demodulation techniques appropriate for each of the modulation types (AM, FM, PM, SSB) described for the transmitter.

The demodulator output then is filtered by a so-called "comb" filter 44. The comb filter is a device having a series of cascaded, harmonically-related pass bands, similar to those shown in the left part of FIG. 4. The fundamental frequency is the same fundamental frequency as was chosen for the transmitter tape transport device, in this case 125 cycles. The comb filter may consist merely of a simple delay line feedback arrangement for all harmonics, or a group of high gain, bridged-T, feedback filters, one for each individual harmonic.

A recent authoritative article on comb filters is entitled "Enhancement of Pulse Train Signals by Comb Filters" by Janis Galejs published by the Professional Group on Information, Theory of the Institute of Radio Engineers, vol. 1P–4 Sept. 1958 in the Transactions on Information Theory.

The comb filter output then is fed to an audio frequency amplifier 45 (FIG. 2) and to a transducer 46 from which the speech information is heard. The intelligence contained at the output of the comb filter is ideally the same as the information contained at the input of the comb filter, except for the noise and spurious interference between successive harmonics. The information contained in the speech signal above 1500 cycles will be affected in that only those sections will be permitted through that correspond to harmonics of 125 cycles.

Data is currently available to show that speech information below 1500 cycles has a 92% articulation, where articulation is defined as the percentage of those sounds, syllables or words recorded by a listener, compared to those uttered by a speaker. This means that there is great value and benefit in transmitting speech that contains only frequency components of 1500 cycles and below.

Signals consisting of noise, spuriouses, or interference of any type, occurring within the reject bands, will be eliminated by whatever degree the comb filter is capable of reject band attenuation. Noise figure will therefore remain intact since the information or intelligence contained in the signal remains untouched.

Reference next is made to FIGURE 3 where the telephone input 51 signifies any variety or variation of telephone line input circuitry. The speech signal is applied to the comb filter 52, where it is of the same form described for FIGURE 2 at the output of the comb filter 44. The filtered speech signal then may be applied to an audio amplifier 53 where it can be fed to any type of audio transducer 54.

Reference is made to FIGURE 4A where the audio input is the output of the transmitter described in FIGURE 1, and is made available by either a radio receiver demodulator, or a telephone line. It is applied to a comb filter and bandpass filter 61, the latter having the characteristics shown in the right end of FIGURE 4. The output monotonic speech then is made available to an amplifier 62 and audio transducer 63 of any type.

The difference between FIG. 4A, on the one hand, and FIGS. 2 and 3, on the other, is that in FIG. 4A there is a band pass filter for the higher frequencies, in addition to the comb filter for the lower frequencies. This is shown in FIG. 4, with the band pass filter passing 1500 to 3000 cycles.

The comb filter alone may go up to, say 1500 cycles, but with this alone a certain amount of valuable information in the speech signal may be lost. In such case it may be advantageous to provide a comb filter for harmonics of the pitch frequency going up to 1500 cycles, and a bandpass filter from 1500 to 3000 cycles. This is what is shown in FIG. 4.

There may be occasions in which it is desired to restore the monotonic speech to substantially the original speech at the receiver. Thus in civilian or public utility telephony, in contrast with military communication, it may be thought desirable for the listener to recognize the voice of the speaker, if known to the listener, instead of merely gaining the information itself, without the usual inflections and consequent voice recognition.

A transmitter for this purpose is shown in FIG. 5, in which some of the speech energy is changed to monotonic speech in a tape transport unit shown in box 73, which corresponds to box 26 in FIG. 1. At the same time another part of the speech energy is supplied to a fundamental extractor 76 which extracts the variable fundamental frequency, and this too is transmitted as a part of the complete signal. As here shown, for this purpose a subcarrier is modulated by the variable fundamental frequency.

The receiver is shown in FIG. 6. The modulated carrier is demodulated and fed through a comb filter 82 to obtain the monotonic speech, with greatly improved signal-to-noise ratio, as before. The subcarrier is demodulated at 89 to obtain the variable fundamental, and this is utilized in means (here including a variable speed tape transport) shown at 83 to restore the monotonic speech to normal speech, which then drives a transducer or speaker 95.

Considering the apparatus for this purpose in greater detail, and reverting to FIG. 5 of the drawing, voice speech is applied to a transducer 71, the output of which is amplified in amplifier 72. One output of amplifier 72 is applied to the recording head of the tape transport described in FIGURE 1 and shown here as box 73. The signal is then subjected to the same operations described for FIGURE 1. Box 73 in FIGURE 5 is the same as box 26 in FIGURE 1, and includes the same constant and variable speed motors to provide the desired monotonic output.

The second output of amplifier 72 is applied via line 74 to a delay line 75. The delay line output is then applied to another fundamental extractor 76 where the pitch frequency is removed from the intelligence. The pitch frequency is then used in modulator 77 to modulate a subcarrier as generated at 78. This is transmitted on telephone lines or is used for modulation in a wireless transmitter 79. At the receiver this may be made use of to reconstitute the pitch frequency variations of the speech. The delay network 75 is for the purpose of compensating for the average delay in the tape transport. The modulation at 79 may be AM, FM, PM, or SSB. The transmitter 28 and antenna 38 shown in FIG. 1 have been omitted in FIG. 5 to save space.

Another way to obtain a reconstituted signal is to monitor the speed of the pickup motor (21 FIGURE 1) as it is varied. If the tape transport pickup capstan (16 FIGURE 1) is turned by a synchronous motor, then the variable frequency applied to the synchronous motor is directly used to modulate the subcarrier, and the latter is transmitted for subsequent amplification and application to a synchronous motor at the record head of the tape transport in the receiver. A tachometer also may be used, coupled to the capstan, and giving a voltage output proportional to the capstan speed. This voltage is used to modulate a subcarrier for transmission.

Reference is now made to FIGURE 6 wherein the signal created by the transmitter described in FIGURE 5 is received and demodulated by a demodulator 81. The speech intelligence is then filtered in the comb filter 82 as previously described, and subsequently applied to a tape transport 83 of the same general type described for the transmitter in FIGURE 1. However, the tape transport 83 differs from the tape transport described for FIGURE 1 in that the variable speed capstan is capstan 92 which drives the tape past the recording head 84, and the constant speed motor 94 drives a capstan 85 near the pickup head 86. The tape moves in the direction shown by the arrow. The speech is amplified by amplifier 87 and applied to an audio transducer 95.

The demodulator 81 also applies the incoming signal via line 88 to a subcarrier demodulator 89. The subcarrier demodulator 89 then applies the subcarrier information (which is the pitch frequency variation of the speech) to the servo drive 90. The servo drive varies the variable speed motor 91 which is mechanically coupled to the variable speed capstan 92.

The tape moves past an erasing head 100 located at any convenient point beyond the pick-up head 86, and preferably near the recording head 84. The tape moves at a variable speed past the recording head 84. The speed is determined by a capstan 92 driven by a variable speed motor 91. The latter responds to the variable fundamental frequency obtained from the subcarrier demodulator 89, and servo 90. When the variable fundamental is higher than the monotonic fundamental, the tape is slowed. Later when it is moved at the constant but relatively higher speed past reproducing head 86, the output is characterized by increased frequency. Conversely, when the variable fundamental of the original speech is lower than the monotonic fundamental, the tape speed at recording head 84 is increased, so that later, when passing head 86 at the constant but relatively lower speed, the fundamental frequency is decreased. Thus the transmitted information about the variable fundamental frequency is utilized to restore the original variations, and so to change the monotonic speech to normal speech in the amplifier 87 and transducer 95.

These relative changes in tape speed are accommodated by movement in one direction or the other of the idlers 101 linked at 102 and resiliently urged toward a rest or neutral position by springs 103.

This accommodation may average evenly and take place indefinitely, but because the difference in some cases may be cumulative for a long time, the idlers 101 preferably are brought back to rest position at frequent intervals by releasing the variable speed drive capstan 92 in response to pauses in speech. For this purpose a part of the output of demodulator 81 may be supplied to an amplifier 96, and a detector 97 which acts as a speech interval detector.

Its output leads to a relay-like solenoid 98 cooperating with clutch mechanism for capstan 92, here symbolized in simple fashion by an angle lever 99 which bodily moves the capstan 92 toward or away from the tape. It will be understood that in practice the capstan is not movable, and instead may be provided with a clutch, or a small idler may be located on the opposite side of the tape and be mounted for movement toward or away from the capstan, as previously described.

The diode detector 97 should have an appropriate time constant in the output as previously described for the speech-presence indicating circuitry in FIGURE 1. As stated above, the detector output activates a solenoid type relay or clutch which engages the tape to the variable speed capstan, depending upon the presence or absence of speech. It may be necessary to incorporate a small delay, possibly a millisecond or two, in the circuit feeding the recording head 84, to compensate for the inertial delay of the clutch mechanism.

Reference is now made to FIGURE 7, which shows a receiver for telephony. This equipment is the same as that shown in FIGURE 6, except that the input audio from a telephone line, or as demodulated by a wireless receiver demodulator, is applied to both a comb filter and bandpass filter 112. It is also applied as before to a subcarrier demodulator 119 and a speech detector 127. The equipment is the same as in FIGURE 6 except that the filter includes a bandpass filter, as previously explained in connection with the lower part of FIGURE 4. The reference numerals in FIG. 7 are the same as in FIG. 6 but increased by 30 in each case. The box 113 corresponds to the box 83 shown in FIG. 6.

The permitted variation in tape speed and position shown schematically in FIGS. 1 and 6 may be increased in amount by appropriate additional festooning of the tape. This is illustrated schematically in FIG. 9 in which the number or reverse passes of the tape has been tripled. In FIG. 9 there are four stationary upper rollers 140, and four stationary lower rollers 141. Between these there are three movable upper idlers 142 and three movable lower idlers 143. The movable idlers are preferably carried on a common frame 144, and this is movable up or down, but is normally centered by means of opposed pull springs 145 and 146. On reflection it will be evident that upward movement of the idlers corresponds to the shortening of six passes of tape at the top, and a corresponding lengthening of six passes of tape at the bottom.

While I have disclosed the present invention as using signals that have been filtered by a comb filter, or a comb filter and a bandpass filter, it is clear that it also may use speech signals that have been filtered in a manner somewhat different. The upper bandpass characteristics may have a comb filter shape with harmonics, pitch frequencies apart. A specific type of filter may be used wherein pass bands of various widths and various sample frequencies will select the unvoiced sounds. Such filters are feasible, and investigation will show that there is an optimum combination of passbands within the upper unvoiced speech region that will give maximum articulation and minimum bandwith. Consequently a point can be obtained for maximum signal-to-noise ratio and maximum articulation.

It will further be clear that altho I have described a method of creating a constant pitch frequency using a tape transport device, other techniques may be devised for making the pitch frequency uniform. It is an essential feature of the present invention to make uniform the pitch frequency of a speech signal containing variable pitch frequencies. In doing this, the sum total of spectrum used for transmitting the speech signal over a period of time is a small portion of what it ordinarily is with variable pitch speech. The specific manner in which the pitch variation is made uniform is subject to considerable variation and modification without departing from the true scope of the invention.

It is believed that the circuitry and operation of my speech communication system, as well as the advantages thereof, will be apparent from the foregoing detailed description. It will also be apparent that while I have shown and described the invention in several preferred forms, changes may be made without departing from the scope of the invention as sought to be defined in the following claims:

I claim:

1. Apparatus for speech communication with improved signal-to-noise ratio, said apparatus comprising means to change some of the speech energy to monotonic speech comprising a fixed predetermined fundamental frequency and its harmonics, a fundamental extractor for extracting the variable fundamental frequency from another part of the speech energy, a source of a high frequency carrier, means to modulate the carrier by means of the monotonic speech, a source of a subcarrier, means to modulate the subcarrier by means of the variable fundamental, a transmitter for transmitting the modulated carrier and subcarrier, a receiver for receiving the modulated waves, means for demodulating the same to obtain the subcarrier and speech, a comb filter to select the monotonic speech, means to demodulate the subcarrier to obtain the variable fundamental, means responsive to the variable fundamental to restore the monotonic speech to normal speech, and a transducer driven by the resulting restored normal speech.

2. Apparatus for speech transmission with improved signal-to-noise ratio, said apparatus comprising means to change some of the speech energy to monotonic speech comprising a fixed predetermined fundamental frequency and its harmonics, a fundamental extractor for extracting the variable fundamental frequency from another part of the speech energy, a source of a high frequency carrier, means to modulate the carrier by means of the monotonic speech, a source of a subcarrier, means to modulate the subcarrier by means of the variable fundamental, and a transmitter for transmitting the modulated carrier and subcarrier.

3. Apparatus for speech reception with improved signal-to-noise ratio, for receiving a carrier modulated by monotonic speech comprising a fixed predetermined fundamental frequency and its harmonics, and a subcarrier modulated by the variable fundamental frequency, said apparatus comprising a receiver for receiving the modulated waves, means for demodulating the same to obtain the subcarrier and speech, a comb filter to select the monotonic speech, means to demodulate the subcarrier to obtain the variable fundamental, means responsive to the variable fundamental to restore the monotonic speech to normal speech, and a transducer driven by the resulting restored normal speech.

References Cited in the file of this patent

UNITED STATES PATENTS

| | | |
|---|---|---|
| 2,286,072 | Dudley | June 9, 1942 |
| 2,306,435 | Graham | Dec. 29, 1942 |
| 2,340,364 | Bedford | Feb. 1, 1944 |
| 2,705,742 | Miller | Apr. 5, 1955 |
| 2,751,437 | Hoeppner | June 19, 1956 |
| 2,908,761 | Raisbeck | Oct. 13, 1959 |
| 2,928,902 | Vilbig | Mar. 15, 1960 |